United States Patent [19]

Dave et al.

[11] Patent Number: 4,855,509

[45] Date of Patent: Aug. 8, 1989

[54] REMOVAL OF ALKALI METALS FROM POLYOLS

[75] Inventors: Shashi B. Dave, Lakewood; Clifford W. Cain, Jr., Bailey, both of Colo.

[73] Assignee: Manville Corporation, Denver, Colo.

[21] Appl. No.: 8,025

[22] Filed: Jan. 28, 1987

[51] Int. Cl.$^4$ ............................................. C07C 37/82
[52] U.S. Cl. .................................................. 518/621
[58] Field of Search ......................................... 568/621

[56] References Cited

U.S. PATENT DOCUMENTS 4,306,943 12/1981 Mori et al. ........................ 568/621

Primary Examiner—Howard T. Mars
Attorney, Agent, or Firm—John D. Lister; Cornelius P. Quinn; Gregory A. Evearitt

[57] ABSTRACT

Alkali and alkaline earth metals are efficiently removed from polyols by contacting the polyol with an alkaline earth mono- or dihydrogen phosphate in an amount sufficient to remove substantially all of the alkali and/or alkaline earth metal from the polyol.

7 Claims, No Drawings

REMOVAL OF ALKALI METALS FROM POLYOLS

FIELD OF THE INVENTION

This invention relates to a process for treating polyols. More particularly, this invention relates to a process for the removal of alkali and alkaline earth metals from polyols.

BACKGROUND OF THE INVENTION

The use of polyurethanes as foams and the like in the building industry has been gaining popularity. For example, one of the efforts which the industry has capitalized on in recent years has been the development of a rigid polyurethane foam which has flame retardance and generates less smoke when it does burn.

Polyurethanes are formed by the reaction of polyisocyanates and polyols. The term "polyol" is used by those in the art to refer to organic compounds containing two or more hydroxyl groups although typical commercially available polyols commonly have hydroxyl numbers in the range of 300 to 500 and higher.

Such commercially available polyols typically contain concentrations of alkali and/or alkaline earth metals, e.g. sodium potassium and calcium in the form of hydroxides which are used as catalysts to form the polyols. Before the polyols are used to form polyurethanes it is desirable to remove as much of the residual alkali or alkaline earth metal catalyst as possible from the polyol. This is because such alkali and alkaline earth metals as sodium, potassium and calcium are also used as catalysts in polyurethane formation and if they are not removed from polyols before the polyols are reacted with polyisocyanates a premature reaction leading to the formation of hard, brittle polyurethanes of undesirable chemical and physical properties can easily occur.

The common practice has been to use magnesium silicates to remove alkali and alkaline earth metals from polyols. While magnesium silicate does an adequate job of adsorbing the metals from the polyol, its use has proven to be disadvantageous due to the fact that commercially available magnesium silicates are very fine and therefore have poor filtration characteristics when one attempts to remove these very fine materials from polyols.

What is needed, therefore, is a process which is economical and yet efficiently and effectively removes at least substantially all of the alkali and alkaline earth metal catalysts from polyols before the latter are used to form polyurethanes.

BRIEF SUMMARY OF THE INVENTION

It has now been discovered that alkali and alkaline earth metals are efficiently removed from polyols by contacting the polyol containing alkali and alkaline earth metal catalysts with an alkaline earth mono- or dihydrogen phosphate in an amount sufficient to remove substantially all of the alkali and/or alkaline metal catalyst from the polyol.

The inventive method is efficient because the alkaline earth mono- and dihydrogen phosphates have good filtration characteristics and are therefore easily removable from polyols once they have been used.

Other features and aspects of the invention will be made clear, as well as the various benefits of the invention, in the more detailed description which follows.

DETAILED DESCRIPTION OF THE INVENTION

As stated herein earlier, alkali and alkaline earth metal catalysts are typically present in commercially available polyols. Such catalysts are generally sodium, potassium and calcium and are generally present in the hydroxide form.

It is thought that the inventive process may be practiced on any commercially available polyol which contains the alkali or alkaline earth metal catalyst. The specific amount of alkai or alkaline earth metal present in the polyol will, of course, vary from situation to situation. For example, the polyol may contain 500 ppm or higher content of the metal.

Any alkaline earth mono- or dihydrogen phosphate compound may be used in the present invention although magnesium phosphates are preferred and magnesium monohydrogen phosphate is most preferred.

The alkaline earth mono- or dihydrogen phosphate compound should be present in an amount sufficient to remove substantially all of the metal from the polyol. Preferably the alkaline mono- or dihydrogen phosphate compound will be present in an amount of from about 0.5 to 3.0 wt% based upon the weight of the polyol and most preferably about 0.5 to 1.5 wt%.

Preferably, the polyol and the alkaline earth compound will be contacted under agitation for about 0.5 to 3 hours. The contact temperature will preferably be less than 100° C. since polyols contain some water content which assists in the alkali metal removal from the polyol.

Once the inventive process has ended and the removal of the alkali or alkaline earth metal from the polyol is therefore substantially complete, the polyol containing the alkaline earth phosphate compound can be filtered through a filter aid, e.g. diatomaceous earth, wherein the alkaline earth phosphate compound will be removed resulting in polyol substantially free of alkali or alkaline earth metal catalyst.

The following examples further illustrate the invention.

EXAMPLES

A polyol (triol) of 3000 molecular weight and hydroxyl number 53–58 mg KOH/gram (CARPOL GP 3012 available from E. R. Carpenter Company of Richmond, Va.) containing 1774 ppm K. 70 ppm Na, and 9.9 ppm Ca was contacted at about 95° C. with 1 wt% of both inventive and non-inventive adsorbents for about four hours initially followed by about 15 minute contact with a 50/50 weight blend of the adsorbent and Celite ® 545 diatomite. The concentration (in ppm) of the K, Na, and Ca of the polyol as well as the filterability of the adsorbent from the polyol were then determined. The results are given in Table A.

TABLE A

| Adsorbent | Filterability | K | Na | Ca |
| --- | --- | --- | --- | --- |
| None | | 1774 | 70 | 9.9 |
| $CaHPO_4$ (inventive) | excellent | 15 | 7 | 1 |
| $MgHPO_4$ (inventive) | excellent | <5 | <3 | <3 |
| $CaSiO_3$ (non-inventive) | good | 22 | 7 | 0.6 |
| $MgSiO_2$ | poor | 110 | 77 | 0.3 |

TABLE A-continued

| Adsorbent | Filterability | K | Na | Ca |
|---|---|---|---|---|
| $MgSiO_2 + Al_2SiO_3$ | fair | 13 | 20 | <0.3 |

The data in Table A demonstrates that the inventive process utilizing $CaHPO_4$ and $MgHPO_4$ give excellent results for both filterability and metal removal from polyol. The use of $MgHPO_4$ is especially preferred for the removal of K and Na.

Reasonable variations and modifications are possible within the scope of the foregoing disclosure without departing from either the spirit or scope of the present invention as defined by the claims.

We claim:

1. A process for the removal of alkali and alkaline earth metals from polyols containing said metals, said process consisting essentially of the step of contacting the polyol containing said alkali and alkaline earth metal with an alkaline earth mono- or dihydrogen phosphate in an amount sufficient to remove substantially all of said alkali and/or alkaline earth metal from said polyol.

2. A process according to claim 1 wherein said metal is K, Na, or Ca.

3. A process according to claim 1 wherein said phosphate is a magnesium phosphate.

4. A process according to claim 3 wherein said magnesium phosphate is magnesium monohydrogen phosphate.

5. A process according to claim 1 wherein said mono- or dihydrogen phosphate is present in an amount of from about 0.5 to 3.0 wt % based upon the weight of the polyol.

6. A process according to claim 5 wherein said phosphate is present in an amount of from about 0.5 to 1.5 wt %.

7. A process according to claim 1 wherein said polyol and said mono- or dihydrogen phosphate are contacted under agitation for about 0.5 to 3 hours at a temperature of less than 100° C.

* * * * *